United States Patent Office 3,174,338
Patented Mar. 23, 1965

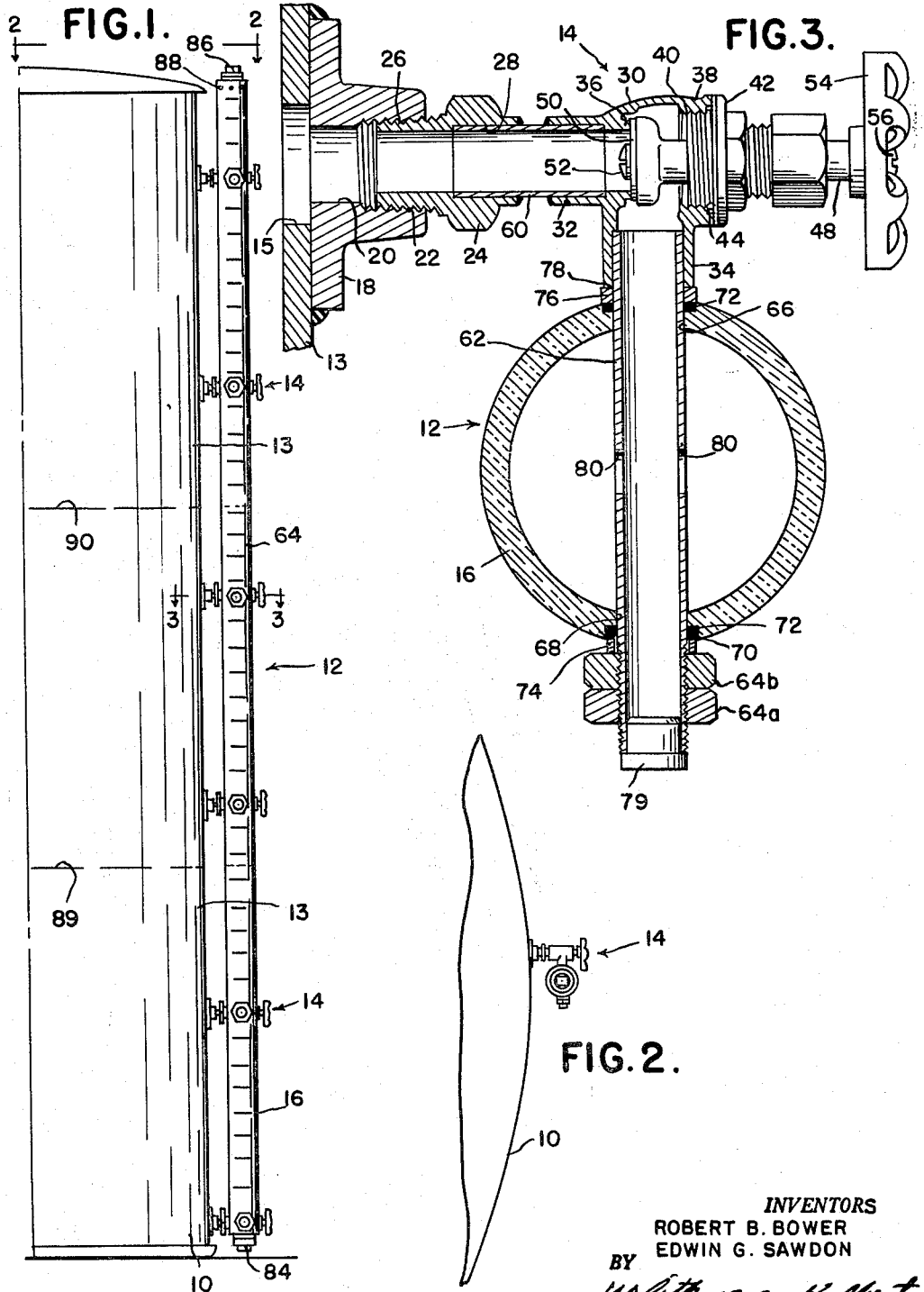

3,174,338
GAUGE STRUCTURE FOR A TANK OR THE LIKE
Robert B. Bower, 1710 Court St., Port Huron, Mich., and Edwin G. Sawdon, 1009 15th St., Marysville, Mich.
Filed Aug. 21, 1961, Ser. No. 132,860
4 Claims. (Cl. 73—332)

This invention relates to a sight gauge for a tank for providing an accurate measurement of the liquid or liquids in the tank, and relates more particularly to a gauge structure having a plurality of longitudinally spaced valves mounted on the tank in such a manner that at least one valve is located thereon intermediate the valves provided at the ends of the tank.

The invention is characterized by the manner in which the sight gauge is associated with a tank having one or more liquids therein of varying densities. With the valves opened in the construction aforesaid, the operator may instantly obtain by visual perception an accurate indication or measurement of the liquid or liquids in the tank by reading the conveniently located graduations provided on a transparent tube.

It is an object of the present invention to provide a sight gauge for a tank containing a liquid which includes a plurality of valves mounted on the tank in which at least one valve is mounted on the tank intermediate the valves provided at the ends of the tank.

Another object is to provide a sight gauge of the aforementioned type for a tank having liquids of different densities, with each of the liquids having a valve associated therewith which opens into a transparent graduated tube of the gauge so that the operator, by visual perception, may instantly obtain an accurate measurement of the quantity of each of the liquids in the tank.

Another object is to provide a sight gauge of the aforementioned type in which the transparent tube is mounted on supporting conduits connected to the outlet side of the valves.

Another object is to provide a sight gauge of the aforementioned type in which the transparent tube may be quickly and easily removed from the associated valves for maintenance purposes or the like.

Another object is to provide a sight gauge of the aforementioned type which is economical to manufacture, efficient and reliable in operation, easy to assemble or disassemble from the associated tank structure, and which is easy to maintain.

Other objects, advantages and novel details of construction of this invention will be made more apparent as this description proceeds, especially when considered in connection with the accompanying drawing, wherein:

FIGURE 1 is an elevational view of the sight gauge mounted adjacent to a tank, a part of which is shown.

FIGURE 2 is a plan view of the structure shown in FIGURE 1 looking in the direction of arrows 2—2 in FIGURE 1.

FIGURE 3 is a sectional view of the gauge assembly taken along the line 3—3 of FIGURE 1.

Referring now to the drawing, the tank is represented by the numeral 10. A sight gauge assembly 12 is mounted on the outside of the wall 13 of the tank 10 and includes a plurality of valve assemblies 14, one of which is shown in cross section in FIGURE 3, and a transparent tube 16. The valve assemblies 14 mounted on the tank 10 are preferably spaced longitudinally apart in equal increments, as an example, between 18 and 24 inches. Generally, the number of valves utilized is determined by the height of the tank 10.

Openings 15 are provided in the wall 13, one opening for each of the valve assemblies 14. Since the valve assemblies 14 are preferably mounted on the tank 10 in like manner, only one of the valve assemblies 14 will be specifically described herein. A flange 18 having a passage 20 extending therethrough is secured to the wall 13 of the tank 10. The passage 20 is substantially concentric with the axis of the opening 15 provided in the wall 13. The outer end of the passage 20 is provided ing flange 18 is threaded at 22 for receiving an adapter or coupler 24. The adapter 24 is provided with a threaded end 26 which is threaded into the threaded end of the flange 18. The other end of the adapter 24 is provided with a socket 28.

Each of the valve assemblies 14 is provided with a body 30 which has a tubular inlet extension 32 and a tubular outlet extension 34. The valve body 30 intermediate the openings provided in the extensions 32 and 34 is provided with a flow passage which has an annular valve seat 36 therein. The valve seat 36 has an axis which is concentric with the axis of the inlet section 32. The valve body 30 is provided with an opened bonnet or extension 38 opposite the inlet extension 32. The extension 38 is provided with internal threads 40. A closure member or cap 42 has an external threaded portion 44 which is threaded into engagement with the threads 40 so as to close the extension 38. The closure member 42 includes means for carrying an axially movable stem 48. The stem 48 is provided with a valve disc 50 which is connected to the enlarged inner end of the stem 48 by means of a screw 52. The stem 48 has on the outer end thereof a handle 54 which is connected thereto by means of a screw 56. Rotation of the handle 54 in a counterclockwise direction will move the valve stem 48 and disc 50 away from the valve seat 36 so as to permit flow through the valve while rotation of the handle 54 in a clockwise direction closes the valve.

A conduit or pipe 60 is inserted into the socket 28 of the adapter 24 on one end thereof and into the inlet extension 32 of the valve body 30 on the other end thereof. The joints between the adapter 24, body 30 and the conduit 60 may be, as an example, soldered, welded or brazed. This is generally accomplished prior to mounting the valve assembly 14 on the tank 10.

The outlet extension 34 of the valve assembly 14 is provided with a tube or conduit 62, one end of which is received in the outlet extension 34. The conduit 62 provides the important functions of providing support for the transparent tube 16, as will be subsequently described, as well as delivering liquid from the valve into the interior of the transparent tube 16.

The transparent tube 16 is provided with a graduated scale 64 which may conveniently employ graduations in inches, barrels or like measurements. The transparent tube 16 may be formed from any desired material which is transparent and which will withstand the effects of the liquids.

The wall of the transparent tube 16 is provided with pairs of radially extending openings 66 and 68. The various pairs of openings 66 and 68 are spaced axially of the tube 16 so as to correspond to the distance between the valve assemblies 14. The transparent tube 16 is mounted on the supporting conduits 62 in such a manner that the conduits 62 extend through the openings 66 and 68 as illustrated in FIGURE 3. The transparent tube 16 is sealed at all of the openings 66 and 68 by means of O-rings or seals 70 which are provided around the conduits 62 in tight sealing engagement with the recesses 72 formed in the outer surface of the tube 16. Seal compressors or metallic rings 74 and 76 are provided for holding the seals 70 in the recesses 72 to provide liquid-tight connections.

Seal compressor 76 has a surface which abuts the outer surface 78 of the outlet extension 34 of the valve body 30 when in an assembled position. The end of the conduit 62 which emerges from the transparent tube 16 is externally threaded and carries lock nuts 64a and 64b which are adapted to be rotated in such a manner so as to urge the seal compressor 74, tube 16, and seal compressor 76 together as a unit against the surface 78 of the outlet extension 34 to hold the transparent tube 16 firmly between the compressors 74 and 76 as is shown in FIGURE 3. An end plug 79 is inserted in the open end of the conduit 62. The plug 79 is preferably soldered to the conduit 62 so as to prevent the removal of the plug 79 from the conduit 62. The conduit 62 is further provided with a pair of radially extending ports 80 which open into the interior of the transparent tube 16.

Referring once more to FIGURE 1, the lower end of the transparent tube 16 is provided with a drain plug 84. The upper end of the tube 16 is provided with a plug 86. A plurality of gas escapement ports or holes 88 is provided near the upper end of the tube 16 just below the plug 86. The gas escapement holes 88 prevent back pressures that might accumulate in the graduated transparent tube 16 due to gas escaping from the gaseous liquids.

FIGURE 1 indicates the top liquid level of two liquids of different densities. By utilizing the structure just described with the valve assemblies 14 open, it is posisble to instantly determine the amount of liquid or liquids in the tank 10 by reading the graduations corresponding to the tops of the liquid levels indicated by the lines 89 and 90.

In operation, the operator rotates the handles 54 in a counterclockwise direction so as to move the valve discs 50 away from the valve seats 36. The various liquids in the tank 10 enter the graduated transparent tube 16 by flowing respectively through the openings 15, the valve bodies 30 and the liquid supply and mounting conduits 62 into the graduated transparent tube 16. When the sight gauge is in use, preferably all the valves are open. With such a construction, the operator can visually determine the amount of each of the liquids in the tank 10 by reading and interpreting the graduated scale 64.

When it is required to move the tank 10, the graduated transparent tube 16 and all of the associated valve assemblies 14, with the exception of the flanges 18, are easily disassembled to prevent damaging any of the parts of the gauge 12. In addition, when it is required to clean the tube 16, the tube 16 can be removed without any difficulty. This is accomplished by initially closing the valve assemblies 14. The drain plug 84 is removed so as to drain all of the liquids in the tube 16. The top plug 86 is then removed. The compression and lock nuts 64a and 64b are then removed, along with the seal compressors 74 and the adjacent seals 70, from the outer ends of the conduits 62. Subsequently, the graduated transparent tube 16 is slipped off of the conduits 62 and thoroughly cleaned or replaced if necessary. When the cleaning or replacement operation has been completed, the transparent tube 16 is again inserted on the mounting conduits 62 and the aforementioned seals, seal compressors, and lock nuts are assembled in reverse order to the procedure mentioned hereinbefore.

With such a construction, it should be noted that the transparent tube 64 is supported entirely by the connections, valve assemblies and the liquid supply and mounting conduits 62. The present invention utilizes standard fittings with the exception of the conduits 62 and the transparent tube 16. The valve assemblies 30, as illustrated, are known in the trade as "compression-stop valves." However, while this particular type of valve has been shown and described, it should be realized that other types may be used such as a "non-freeze" valve.

What we claim as our invention is:

1. In combination, a tank containing two gaseous liquids of different densities and having an upright wall provided throughout substantially its height with a series of vertically aligned equidistantly spaced horizontal openings, a series of vertically aligned equidistantly spaced valve assemblies adjacent and substantially in common horizontal planes with said openings, each valve assembly having a body provided with a horizontal tubular inlet extension and a horizontal tubular outlet extension, the inlet extensions of said valve bodies being substantially in alignment with said horizontal openings, the outlet extensions being disposed at substantially right angles to said inlet extensions, horizontal conduit means in communication with said horizontal openings and terminally connected to the upright wall of said tank and to the inlet extensions of said valve bodies for conducting the two gaseous liquids of different densities respectively from said tank to certain of said valve bodies, a sight measuring gauge for the two gaseous liquids of different densities in said tank including an upright transparent tube substantially parallel and substantially equal in height to the upright wall of said tank, said upright transparent tube having closed upper and lower ends and provided throughout substantially its entire length between said closed upper and lower ends with equidistantly spaced graduations to indicate the respective levels in said tank of said two gaseous liquids of different densities, horizontal tubes projecting from the outlet extensions of said valve bodies and extending diametrically through said upright transparent tube at vertically spaced points thereof for supporting the latter, said horizontal tubes being adapted to receive certain of the two gaseous liquids of different densities respectively from said valve bodies and provided within said transparent tube with outlet ports for said two gaseous liquids of different densities respectively, means for closing the outer ends of said horizontal tubes, sealing means encircling said horizontal tubes at diametrically opposite sides of said upright transparent tube and engaging recesses in the latter, rings encircling said horizontal tubes at diametrically opposite sides of said transparent tube and engaging said sealing means, and adjustable means on said horizontal tubes adjacent the outer ends thereof cooperating with said outlet extensions to hold said rings, sealing means and transparent tube under compresison.

2. The combination defined in claim 1, wherein the upright transparent tube is provided adjacent its upper closed end with a plurality of escapement ports for gases from said gaseous liquids.

3. The combination defined in claim 1, wherein each horizontal conduit means comprises a flange secured to the upright wall of said tank and having a passage therethrough in communication with an opening in said tank, a tube connected to an inlet extension of a valve body, and a tubular coupler having at one end thereof a tubular socket receiving the outer end of said tube and having at its other end an exteriorly threaded portion threadedly engaging the passage in said flange.

4. In combination, a tank containing a fluid and having an upright wall provided throughout substantially its height with a series of vertically aligned equidistantly spaced horizontal openings, a series of vertically aligned equidistantly spaced valve assemblies adjacent and substantially in common horizontal planes with said openings, each valve assembly having a body provided with a horizontal tubular inlet extension and a horizontal tubular outlet extension, the inlet extensions of said valve bodies being substantially in alignment with said horizontal openings, the outlet extensions being disposed at substantially right angles to said inlet extensions, horizontal conduit means in communication with said horizontal openings and terminally connected to the upright wall of said tank and to the inlet extensions of said valve bodies for conducting fluid from said tank to said valve bodies, a sight measuring gauge for the fluid in said tank including an upright transparent tube substantially parallel and substantially equal in height to the upright wall of said tank, said upright transparent tube having closed upper and lower ends and provided throughout substantially its entire length between said closed upper and lower ends with equidistantly spaced graduations to indicate the level of fluid in said tank, horizontal tubes projecting from the outlet extensions of said valve bodies and extending diametrically through said upright transparent tube at vertically spaced points thereof for supporting the latter, said horizontal tubes being adapted to receive fluid from said valve bodies and provided within said upright transparent tube with outlet ports for said fluid, means for closing the outer ends of said horizontal tubes, resilient sealing rings encircling said horizontal tubes at diametrically opposite sides of said upright transparent tube and engaging recesses in the latter, metallic rings encircling said horizontal tubes at diametrically opposite sides of said transparent tube and engaging said resilient sealing rings, and adjustable means on said horizontal tubes adjacent the outer ends thereof cooperating with said outlet extensions to hold said metallic rings, resilient sealing rings and transparent tube under compression.

References Cited in the file of this patent

UNITED STATES PATENTS

| | | |
|---|---|---|
| 57,118 | Githens | Aug. 14, 1866 |
| 200,138 | Heard | Feb. 12, 1878 |
| 278,223 | Clarke | May 22, 1883 |
| 946,106 | Burns | Jan. 10, 1910 |
| 1,201,128 | Wirth | Oct. 10, 1916 |
| 1,210,385 | Hunziker | Dec. 26, 1916 |
| 1,281,945 | Greenaway | Oct. 15, 1918 |
| 1,496,481 | Melius | June 3, 1924 |
| 2,590,947 | Denis | Apr. 1, 1952 |